(12) United States Patent
Kase (10) Patent No.: US 9,890,073 B2
(45) Date of Patent: Feb. 13, 2018

(54) GLASS FOR CHEMICAL STRENGTHENING, CHEMICALLY STRENGTHENED GLASS, AND METHOD FOR PRODUCING CHEMICALLY STRENGTHENED GLASS

(71) Applicant: ASAHI GLASS COMPANY, LIMITED, Chiyoda-ku (JP)

(72) Inventor: Junichiro Kase, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/179,433

(22) Filed: Jun. 10, 2016

(65) Prior Publication Data

US 2016/0355432 A1 Dec. 8, 2016

Related U.S. Application Data

(63) Continuation of application No. PCT/JP2014/083003, filed on Dec. 12, 2014.

(30) Foreign Application Priority Data

Dec. 13, 2013 (JP) .................................. 2013-258464
Feb. 7, 2014 (JP) .................................. 2014-022724

(51) Int. Cl.
| | | |
|---|---|---|
| C03C 3/083 | (2006.01) | |
| C03C 3/085 | (2006.01) | |
| C03C 3/087 | (2006.01) | |
| C03C 21/00 | (2006.01) | |
| C03C 4/18 | (2006.01) | |

(52) U.S. Cl.
CPC ............. *C03C 3/087* (2013.01); *C03C 3/085* (2013.01); *C03C 4/18* (2013.01); *C03C 21/002* (2013.01); *C03C 2204/00* (2013.01)

(58) Field of Classification Search
None
See application file for complete search history.

(56) References Cited

U.S. PATENT DOCUMENTS

| | | | | |
|---|---|---|---|---|
| 3,241,937 | A * | 3/1966 | Michalik | C03B 18/08 65/182.1 |
| 6,518,211 | B1 * | 2/2003 | Bradshaw | C03C 3/085 428/410 |
| 2005/0044893 | A1 * | 3/2005 | Coon | C03B 19/12 65/32.1 |
| 2009/0000335 | A1 * | 1/2009 | Urata | C03C 3/087 65/134.2 |
| 2009/0325776 | A1 * | 12/2009 | Murata | C03B 17/06 501/66 |
| 2010/0162766 | A1 * | 7/2010 | Docquier | C03B 18/20 65/158 |
| 2011/0159318 | A1 * | 6/2011 | Endo | G11B 5/7315 428/846.9 |
| 2012/0083401 | A1 | 4/2012 | Koyama et al. | |
| 2012/0277085 | A1 * | 11/2012 | Bookbinder | C03C 19/00 501/11 |
| 2013/0316162 | A1 * | 11/2013 | Murata | C03C 3/087 428/220 |
| 2014/0033766 | A1 * | 2/2014 | Maehara | C03B 5/2252 65/66 |
| 2014/0227525 | A1 | 8/2014 | Matsuda et al. | |
| 2014/0234607 | A1 | 8/2014 | Matsuda et al. | |
| 2014/0248495 | A1 | 9/2014 | Matsuda et al. | |
| 2016/0083288 | A1 * | 3/2016 | Kase | C03C 3/087 428/220 |

FOREIGN PATENT DOCUMENTS

| | | | |
|---|---|---|---|
| JP | 57-129838 | 8/1982 | |
| JP | 57-129839 | 8/1982 | |
| JP | 2002-507538 | 3/2002 | |
| JP | 2012-148955 | 8/2012 | |
| JP | 5278633 | 9/2013 | |
| WO | WO 2013005588 A1 * | 1/2013 | ........... C03C 21/006 |
| WO | WO 2013/047676 A1 | 4/2013 | |

OTHER PUBLICATIONS

Gorokhovski et al., "Effect of Composition of the Tin Melt Tank Atmosphere on Microhardness of Float Glass Surface," Glass and Ceramics, vol. 56, Nos. 5-6, 1999, pp. 170-171.*
Search Report issued Mar. 10, 2015 in PCT/JP2014/083003 filed on Dec. 12, 2014 (with English translation).
Written Opinion issued Mar. 10, 2015 in PCT/JP2014/083003 filed on Dec. 12, 2014.

* cited by examiner

*Primary Examiner* — David Sample
(74) *Attorney, Agent, or Firm* — Oblon, McClelland, Maier & Neustadt, L.L.P.

(57) ABSTRACT

A glass for chemical strengthening is a glass sheet containing, as expressed by mass percentage based on oxides, 60 to 75% of $SiO_2$, 3 to 12% of $Al_2O_3$, 2 to 10% of MgO, 0 to 10% of CaO, 0 to 3% of SrO, 0 to 3% of BaO, 10 to 18% of $Na_2O$, 0 to 8% of $K_2O$, 0 to 3% of $ZrO_2$, 0 to 0.3% of $TiO_2$, 0.005 to 0.2% of $Fe_2O_3$, and 0.02 to 0.4% of $SO_3$. The glass has a sheet thickness of 0.2 mm or more and 1.2 mm or less. A value of β-OH measured without polishing both front and back surfaces of the glass sheet is lower than a value of β-OH measured after polishing surface layers of both the front and back surfaces of the glass sheet by 50 μm or more each.

8 Claims, 1 Drawing Sheet

GLASS FOR CHEMICAL STRENGTHENING, CHEMICALLY STRENGTHENED GLASS, AND METHOD FOR PRODUCING CHEMICALLY STRENGTHENED GLASS

TECHNICAL FIELD

The present invention relates to a glass for chemical strengthening, favorable as a raw sheet glass for a chemically strengthened glass that is used in a cover glass and a touch sensor glass of a touch panel display equipped in information instruments such as tablet PCs, notebook-size PCs, smartphones, e-book readers, etc., a cover glass of liquid-crystal televisions, PC monitors, etc., a cover glass of automobile instrument panels, etc., a cover glass for solar cells, and a multilayer glass for use in windows of buildings and houses, etc., to a chemically strengthened glass using the glass for chemical strengthening, and to a method for producing the chemically strengthened glass.

BACKGROUND ART

Recently, as for information instruments, ones equipped with a touch panel display have been becoming mainstream, as seen in tablet PCs, smartphones, e-book readers, etc. A touch panel display has a structure where a touch sensor glass and a cover glass are layered on a glass substrate for display. There is also known an integrated configuration of a touch sensor glass and a cover glass, which is called OGS (one glass solution).

In a touch sensor glass, a cover glass and an OGS glass, any glass is desired to be thin and have a high strength, for which a glass that has been chemically strengthened through ion exchange, that is, a chemically strengthened glass is used.

The strength characteristics of these chemically strengthened glasses are generally expressed as a surface compressive stress (CS, compressive stress) and a depth of compressive stress (DOL, depth of layer). In the case where a raw sheet glass of ordinary soda lime glass is subjected to chemical strengthening treatment, in general, a chemically strengthened glass having CS of 500 to 600 MPa and DOL of 6 to 10 μm can be obtained.

There has been proposed an aluminosilicate glass having an easily ion-exchangeable composition for enhancing the strength, and in the case where a raw sheet glass of an aluminosilicate glass is subjected to the same chemical strengthening treatment, there can be obtained a chemically strengthened glass having CS of 700 to 850 MPa and DOL of 20 to 100 μm.

These glasses for chemical strengthening are produced according to a float process or a fusion process (also referred to as an overflow downdraw process). The float process is known as production method for windowpanes in buildings and the like, and this is a method of casting a molten glass onto a molten tin and forming it into a planar form. The other fusion process is known as a production method for alkali-free glasses for displays and the like, and this is a method of overflowing a glass down to both sides from an upper gutter and fusing it at the tip of the lower sword to form it into a planar form. For the glass for chemical strengthening, in general, a soda lime glass is produced according to a float process, and an aluminosilicate glass is produced according to both production methods of a float process and a fusion process.

Soda lime glass produced according to a float process is inexpensive as compared with aluminosilicate glass. However, regarding the chemically strengthened glass of an already-existing soda lime glass, CS thereof could hardly be increased to a level of glass strengthening that has become required recently. Accordingly, there has been proposed a chemical strengthening treatment method that can increase the glass strength in a chemically strengthened glass using a soda lime glass (for example, see PTL 1).

CITATION LIST

Patent Literature

PTL 1: WO2013/47676 (Japanese Patent No. 5278633)

SUMMARY OF INVENTION

Technical Problem

According to the method disclosed in PTL 1, it requires strictly controlled two-stage chemical strengthening treatment, in which a nitrate salt having a different composition is used in the first stage treatment and the second stage treatment, and the processing temperature differs therebetween. Consequently, it requires two strengthening treatment tanks. In addition, through the two-stage treatment, the stress on both surfaces of the glass requires being balanced. The glass produced according to a float process has a tin-contact surface and a tin-non-contact surface, and when the chemical strengthening method of PTL 1 is applied thereto, at least one surface thereof must be removed so as to make the surfaces have the same property. It is thus defective in that the number of the processing steps increases.

On the other hand, when an aluminosilicate glass is chemically strengthened, a higher CS and DOL than those of a soda lime glass can be obtained. However, an aluminosilicate glass contains more expensive components than those in an ordinary soda lime glass and, in addition, requires being melted and formed at a higher temperature than that for an ordinary soda lime glass. Therefore it is problematic in that the production cost thereof is high.

An object of the present invention is to provide a glass for chemical strengthening capable of improving the strength by being subjected to chemical strengthening treatment similar to that in a conventional process only once, more than that of an ordinary soda lime glass, and also to provide a chemically strengthened glass using the glass for chemical strengthening and a method for producing the chemically strengthened glass.

Solution to Problem

The present inventor has found that, by producing a glass having a specific composition according to a float process, the glass can be improved in the strength more than in a conventional soda lime glass, through being subjected to the same chemical strengthening treatment as in a conventional process, and has completed the present invention.

Specifically, the present invention is as follows.

1. A glass for chemical strengthening that is a glass sheet containing, as expressed by mass percentage based on oxides, 60 to 75% of $SiO_2$, 3 to 12% of $Al_2O_3$, 2 to 10% of MgO, 0 to 10% of CaO, 0 to 3% of SrO, 0 to 3% of BaO, 10 to 18% of $Na_2O$, 0 to 8% of $K_2O$, 0 to 3% of $ZrO_2$, 0 to 0.3% of $TiO_2$, 0.005 to 0.2% of $Fe_2O_3$, and 0.02 to 0.4% of $SO_3$, and having a sheet thickness of 0.2 mm or more and 1.2 mm or less, in which a value of β-OH measured without polishing both front and back surfaces of the glass sheet is lower than a value of β-OH measured after polishing surface layers of both the front and back surfaces of the glass sheet by 50 μm or more each.

2. The glass for chemical strengthening according to the above item 1, in which the glass sheet is formed according to a float process.

3. The glass for chemical strengthening according to the above item 2, from which the surface layers of both the front and back surfaces of the glass sheet has not been polished away after being formed according to the float process.

4. The glass for chemical strengthening according to the above items 1 to 3, in which a difference between the value of β-OH measured without polishing both the front and back surfaces of the glass sheet and the value of β-OH measured after polishing the surface layers of both the front and back surfaces of the glass sheet by 50 μm or more each is 0.003 $mm^{-1}$ or more.

5. A chemically strengthened glass obtained by chemically strengthening the glass for chemical strengthening of any one of the above items 1 to 4.

6. The chemically strengthened glass according to the above item 5, having a surface compressive stress of 600 MPa or more and a depth of compressive stress of 5 μm or more and 30 μm or less.

7. The chemically strengthened glass according to the above item 5, having a surface compressive stress of 700 MPa or more and a depth of compressive stress of 8 μm or more and 20 μm or less.

8. A method for producing a chemically strengthened glass, including a chemical strengthening step of subjecting the glass for chemical strengthening of any one of the above items 1 to 4 to an ion-exchange treatment.

9. A glass that is a glass sheet containing, as expressed by mass percentage based on oxides, 60 to 75% of $SiO_2$, 3 to 12% of $Al_2O_3$, 2 to 10% of MgO, 0 to 10% of CaO, 0 to 3% of SrO, 0 to 3% of BaO, 10 to 18% of $Na_2O$, 0 to 8% of $K_2O$, 0 to 3% of $ZrO_2$, 0 to 0.3% of $TiO_2$, 0.005 to 0.2% of $Fe_2O_3$, and 0.02 to 0.4% of $SO_3$, and having a sheet thickness of 0.2 mm or more and 1.2 mm or less, in which a value of β-OH measured without polishing both front and back surfaces of the glass sheet is lower than a value of β-OH measured after polishing surface layers of both the front and back surfaces of the glass sheet by 50 μm or more each.

10. The glass according to the above item 9, in which, after being formed according to a float process, the surface layers of both the front and back surfaces of the glass sheet has not been polished away.

11. The glass according to the above item 9 or 10, in which a difference between the value of β-OH measured without polishing both the front and back surfaces of the glass sheet and the value of β-OH measured after polishing the surface layers of both the front and back surfaces of the glass sheet by 50 μm or more each is 0.003 $mm^{-1}$ or more.

12. The glass according to any one of the above items 9 to 11, in which the glass sheet is applicable to a chemical strengthening treatment.

13. A chemically strengthened glass obtained by chemically strengthening the glass of the above item 12.

Advantageous Effects Of Invention

The glass for chemical strengthening of the present invention has a specific composition, which is formed in a planar form by extending a glass according to a float process, and can provide a chemically strengthened glass having an effectively increased CS value through chemical strengthening treatment.

DESCRIPTION OF EMBODIMENTS

In the following, the glass for chemical strengthening of the present invention and the chemically strengthened glass produced by applying chemical strengthening treatment to the glass for chemical strengthening are collectively called the glass of the present invention.

One embodiment of the present invention is described below. The glass for chemical strengthening of the present embodiment is a glass sheet containing, as expressed by mass percentage based on oxides, 60 to 75% of $SiO_2$, 3 to 12% of $Al_2O_3$, 2 to 10% of MgO, 0 to 10% of CaO, 0 to 3% of SrO, 0 to 3% of BaO, 10 to 18% of $Na_2O$, 0 to 8% of $K_2O$, 0 to 3% of $ZrO_2$, 0 to 0.3% of $TiO_2$, 0.005 to 0.2% of $Fe_2O_3$, and 0.02 to 0.4% of $SO_3$, and having a sheet thickness of 0.2 mm or more and 1.2 mm or less, in which a value of β-OH measured without polishing both front and back surfaces of the glass sheet is lower than a value of β-OH measured after polishing surface layers of both the front and back surfaces of the glass sheet by 50 μm or more each.

The reason why the glass composition of the glass for chemical strengthening of the present embodiment is defined to be within the above-mentioned range is described below.

$SiO_2$ is known as a component to form a network structure in a glass microstructure, and is a main component to constitute a glass. The content of $SiO_2$ is 60% or more, preferably 63% or more, more preferably 65% or more, and even more preferably 67% or more. The content of $SiO_2$ is 75% or less, preferably 73% or less and more preferably 71% or less. When the content of $SiO_2$ is 60% or more, it is advantageous in point of stability and weather resistance as a glass. On the other hand, when the content of $SiO_2$ is 75% or less, it is advantageous in point of meltability and formability.

$Al_2O_3$ has an effect of improving ion exchangeability in chemical strengthening, and especially the effect thereof for improving CS is great. It is also known as a component for improving the weather resistance of glass. In addition, it has an effect of inhibiting invasion of tin from the bottom surface in forming according to a float process. The content of $Al_2O_3$ is 3% or more, preferably 3.6% or more, more preferably 4.2% or more, and even more preferably 4.7% or more. The content of $Al_2O_3$ is 12% or less, more preferably 9% or less, even more preferably 8% or less, and still more preferably 7% or less. When the content of $Al_2O_3$ is 3% or more, a desired CS value can be obtained through ion exchange, and the effect of preventing invasion of tin can be realized. On the other hand, when the content of $Al_2O_3$ is 12% or less, the devitrification temperature would not rise so greatly even when the viscosity of glass is high, which is therefore advantageous in point of melting and forming in a soda lime glass production line.

MgO is a component for stabilizing a glass, and is indispensable. The content of MgO is 2% or more, preferably 3% or more and more preferably 3.6% or more. The content of MgO is 10% or less, preferably 8% or less, more preferably 7% or less, and even more preferably 6% or less. When the content of MgO is 2% or more, the chemical resistance of the glass is good. In addition, the meltability at a high temperature is good and devitrification would hardly occur. On the other hand, when the content of MgO is 10% or less, the property that devitrification hardly occurs could be maintained and a sufficient ion-exchanging rate could be realized.

Though not indispensable, CaO is a component for stabilizing a glass. CaO tends to inhibit alkali ion exchange, and especially when DOL is desired to be large, it is preferable that the content thereof is reduced or the component is not contained. On the other hand, for enhancing chemical resistance, it is preferable that it is contained in an amount of 2% or more, preferably 4% or more and more preferably 6% or more. The CaO amount, if contained, is 10% or less, preferably 9% or less and more preferably 8.2% or less. When the content of CaO is 10% or less, a sufficient ion-exchanging rate could be maintained and a desired DOL could be realized.

Though not indispensable, SrO may be contained for the purpose of lowering the high-temperature viscosity of glass and for lowering the devitrification temperature thereof SrO has an effect of lowering ion-exchanging efficiency, and therefore especially in the case where DOL is desired to be increased, it is preferable not contained. The SrO amount, if contained, is 3% or less, preferably 2% or less and more preferably 1% or less.

Though not indispensable, BaO may be contained for the purpose of lowering the high-temperature viscosity of glass and for lowering the devitrification temperature thereof. BaO has an effect of increasing the specific gravity of glass, and therefore in the case where weight reduction is intended, it is preferable not contained. The BaO amount, if contained, is 3% or less, preferably 2% or less and more preferably 1% or less.

$Na_2O$ is an indispensable component for forming a surface compressive stress layer through ion exchange, and has an effect of increasing DOL. In addition, it is a component for lowering the high-temperature viscosity and the devitrification temperature of glass, and improving the meltability and formability of glass. The content of $Na_2O$ is 10% or more, preferably 12% or more and more preferably 13% or more. In turn, the content of $Na_2O$ is 18% or less, preferably 17% or less and more preferably 16% or less. When the content of $Na_2O$ is 10% or more, a desired surface compressive stress layer can be formed through ion exchange. On the other hand, when the content of $Na_2O$ is 18% or less, sufficient weather resistance can be realized.

Though not indispensable, $K_2O$ has an effect of increasing an ion-exchanging rate and increasing DOL, and therefore can be contained. On the other hand, when the content of $K_2O$ is too large, a sufficient CS could not be realized. In the case where $K_2O$ is contained, it is preferably 8% or less, more preferably 6% or less and even more preferably 4% or less. When the content of $K_2O$ is 8% or less, a sufficient CS can be realized. In addition, since $K_2O$ is a component of increasing the thermal expansion coefficient, it is preferable that the content thereof is reduced for preventing deformation of glass in heating. The content of $K_2O$ is preferably 1% or less and more preferably 0.5% or less.

The glass for chemical strengthening of the present embodiment has a specific composition, in which, in particular, the contents of $Al_2O_3$ and $(Na_2O+K_2O)$ fall within a specific range, and therefore the CS value can be effectively increased by chemical strengthening treatment, and at the same time, the devitrification temperature and the high-temperature viscosity can be prevented from increasing thereby providing a glass for chemical strengthening that can be readily produced in a float furnace for soda lime glass.

$Al_2O_3$ has an effect of increasing CS, while $Na_2O$ has an effect of increasing DOL but simultaneously lowering CS. $K_2O$ has an effect of increasing an ion-exchanging rate and increasing DOL. Accordingly, when $Al_2O_3$, $Na_2O$ and $K_2O$ are contained in a specific ratio, it becomes possible to increase the CS value by chemical strengthening treatment. The ratio of $(Na_2O+K_2O)/Al_2O_3$ is 5 or less, preferably 4.5 or less and more preferably 4 or less.

$Al_2O_3$ is a component of increasing the devitrification temperature and the high-temperature viscosity, while $Na_2O$ and $K_2O$ are components of lowering both the two. When $(Na_2O+K_2O)/Al_2O_3$ is less than 1.8, the devitrification temperature is high and the high-temperature viscosity is also high. In the case, in addition, DOL may be shallow beyond necessity. For stably producing glass without increasing the glass melting temperature more than necessary and without causing devitrification, and for maintaining the necessary DOL for improving the strength in chemical strengthening, a preferred ratio of $(Na_2O+K_2O)/Al_2O_3$ is 1.8 or more, more preferably 2.2 or more, even more preferably 2.4 or more and still more preferably 2.6 or more.

Though not indispensable, $ZrO_2$ is generally known to have an effect of increasing the surface compressive stress in chemical strengthening. However, even when a small amount of $ZrO_2$ is contained, the effect thereof is not so large relative to cost increase. Accordingly, within a range of acceptable cost allocation, $ZrO_2$ may be contained in an arbitrary range. It is, if contained, preferably 3% or less.

$TiO_2$ much exists in natural resources, and is known to be a coloring source of yellow. The content of $TiO_2$ is 0.3% or less, preferably 0.2% or less and more preferably 0.1% or less. When the content of $TiO_2$ exceeds 0.3%, the glass becomes yellowish.

Though not an indispensable component, $Fe_2O_3$ exists anywhere in the natural world and production lines, and therefore it is a component extremely difficult to make the content thereof zero. It is known that $Fe_2O_3$ in an oxidized state causes coloration in yellow and FeO in a reduced state causes coloration in blue, and it is also known that glass may color in green depending on the balance of the two. The content of $Fe_2O_3$ is typically 0.005% or more.

In the case where the glass of the present embodiment is used for displays, windowpanes and solar devices, deep coloring thereof is undesirable. When the total iron amount (total Fe) is calculated as $Fe_2O_3$, the content thereof is preferably 0.2% or less, more preferably 0.15% or less and even more preferably 0.11% or less.

Especially in the case where the glass of the present embodiment is used for displays, blue coloration by FeO is undesirable in order that the transmission color could be kept as a natural color tone. In the case where it is used for solar devices, it is desirable that the infrared ray absorption by FeO is small. For this, glass where the amount of FeO is small is preferred. The ratio of FeO to $Fe_2O_3$ in glass is generally expressed as $(Fe^{2+}/(Fe^{2+}+Fe^{3+})\times100(\%))$. Redox of glass is determined mainly by the melting temperature thereof, and increases when melting at a high temperature but lowers when melting at a low temperature. For suppressing color tone and infrared ray absorption, Redox of Glass is preferably 35% or less, more preferably 32% or less and even more preferably 30% or less. When the melting temperature is lowered too much, bubble defects in glass increase, and therefore Redox of glass is preferably 18% or more, more preferably 21% or more and even more preferably 23% or more.

$SO_3$ is a clarifying agent in melting a glass. In general, the content thereof in a glass is not more than a half of the amount to be given by the raw material thereof. The content of $SO_3$ in the glass is 0.02% or more, preferably 0.05% or more and more preferably 0.1% or more. In turn, the content of $SO_3$ is 0.4% or less, preferably 0.35% or less and more preferably 0.3% or less. When the content of $SO_3$ is 0.02% or more, the glass can be sufficiently clarified to remove babble defects. On the other hand, when the content of $SO_3$ is 0.4% or less, defects of sodium sulfate formed in the glass may be inhibited.

In addition, a chloride, a fluoride or the like may be suitably contained as a clarifying agent in melting a glass. The glass of the present invention is essentially formed of the above-mentioned components but may contain any other component within a range not detracting from the object of the present invention. In the case where such components are contained, the total content of the components is preferably 5% or less, more preferably 3% or less and typically 1% or less. Hereinafter the above-mentioned other components will be described exemplarily.

ZnO may be contained, for example, in an amount of up to 2% for improving the meltability of glass at a high temperature. However, in the case of production according to a float process, the component may be reduced in a float bath to cause defects in products, and is therefore preferably not contained.

$B_2O_3$ may be contained in a range of less than 1% for improving the meltability at a high temperature or the strength of the glass. In general, when $B_2O_3$ is contained together with an alkali component of $Na_2O$ or $K_2O$, evaporation thereof may occur vigorously to greatly corrode bricks. Therefore, it is preferable that $B_2O_3$ is not substantially contained.

$Li_2O$ is a component that lowers the strain point to facilitate stress relaxation, therefore making it difficult to obtain a stable surface compressive stress layer. Therefore, it is preferably not contained. Even when contained, the content tehreof is preferably less than 1%, more preferably 0.05% or less and even more preferably less than 0.01%.

The present inventor made glasses of some different compositions according to a float process, subjected them to chemical strengthening treatment, measured the surface compressive stress and the compressive stress depth, that is, CS and DOL thereof, and investigated the difference of the glass sheets formed according to a float process in point of the surface layer and the inside thereof, and as a result, has found that CS can be increased under a specific condition.

The value of the surface compressive stress obtained by chemically strengthening glass depends on the glass composition. As described hereinabove, $Al_2O_3$ and $ZrO_2$ are components of increasing CS, while $Na_2O$ and $K_2O$ are components of increasing DOL but lowering CS. On the other hand, CaO is a component of lowering DOL. $SiO_2$ relatively increases DOL and lowers CS.

The value of surface compressive stress is influenced also by the water content in glass, in addition to the above. The present inventor has found that, when glasses having the same mother composition but having a different water content are chemically strengthened, the value of CS lowers with the increase in the water content, and the value of DOL slightly lowers with the increase in the water content. Here, the water content in glass indicates a value of β-OH obtained from the infrared ray absorbance index.

The value of surface compressive stress varies also depending on the structural temperature of glass. When the annealing rate of glass is lowered, the structural temperature thereof lowers and the density of the glass increases. In ion exchange of a glass having the same composition but having an increased density, the surface compressive stress increases owing to the effect of the ion having a large diameter that has invaded therein. Specifically, performing annealing more slowly increases the CS.

The characteristic of chemical strengthening is also influenced by the purity of the molten salt for use in ion exchange. In general, a molten salt of potassium nitrate is used, and glass is immersed therein for ion exchange of sodium ions in the glass with potassium ions in the molten salt. When the same salt is used plural times, the sodium concentration in the potassium nitrate salt increases so that the ion-exchanging efficiency lowers and CS obtained by chemical strengthening therefore lowers.

In a glass produced according to a float process, compared with a glass produced in a crucible experiment, the value of CS obtained by chemically strengthening lowers. This is considered to be influenced by that the cooling rate for the annealing in the float process line is higher than for the annealing in the crucible experiment; and that in the float furnace, heavy oil or natural gas is fired and therefore the steam concentration in the atmosphere is higher than that in the electric furnace, leading to an increase in the water content of the glass. In addition, the same nitrate salt is repeatedly used in the chemical strengthening tank used in industrial lines, and therefore in general, CS tends to lower in the chemical strengthening in mass-production lines than in the chemical strengthening of laboratory scale.

In glass sheet formation, in general, glass sheets having a different thickness are produced by varying the glass drawing speed. Specifically, for glasses with small thickness, the drawing speed is high, and therefore they are cooled more rapidly and CS thereof by chemical strengthening thereby lowers. Referring to the difference depending on the formation processes, the annealing zone is longer in a float process than in a fusion process, and therefore it is advantageous for increasing CS owing to the reduction in the structural temperature.

Though differing depending on the formation processes, the steam concentration is generally lower in the formation atmosphere than in the melting atmosphere. In the glass that contains water fed from the firing atmosphere in the melting furnace, the water in the surface layer evaporates during forming and CS thereof therefore increases. A glass with small thickness takes a short period of time in passing through the forming region, and therefore vaporization of water from the surface layer is small. As a result, as compared with a thick glass, the water content in the surface layer is large and CS thereof relatively lowers. To that effect, a thin glass sheet is produced under the condition disadvantageous for CS increase. In a float process, the forming region is longer than in a fusion process, and therefore it is advantageous for CS increase owing to water vaporization from the surface layer.

The present inventor has contrived a composition that is intended to increase in CS as compared with that of an ordinary soda lime glass, and has produced glass sheets having a different thickness according to a float process. In that regard, the dew point of the float bath is controlled to be lower than usual so that water in the surface layer of the glass sheet could readily evaporate out. The float-formed glass and the glass that had been polished on both surfaces thereof so as to be thinned after float formation were chemically strengthened together, and as a result, CS before polishing was higher than that after polishing in the float-formed glass with small thickness, while CS before polishing was lower than that after polishing in the thick glass. Specifically, even thin sheet glass that is disadvantageous for CS increase can be efficiently increased in CS by being made thinner than a specific thickness level. The present inventor formed thin sheets according to a float process, but it is considered that CS could be increased similarly even in different production processes.

CS change owing to the influence of the surface layer could be considered from the above-mentioned factors. CS lowers when the composition of the surface layer varies toward the direction rich in $SiO_2$. On the other hand, CS increases through water vaporization. It is considered that the difference in the structural temperature between the surface layer and the inside, that is, in the annealing rate would be small. Though not always clear, the reason why CS may lower or increase in the surface layer of a formed glass would be considered to be because of the balance between the composition change and the water evaporation. In the glass of the present embodiment, water content lowers at a depth of about 50 μm from the surface layer and the water content in the part nearer to the surface layer is smaller, that is, β-OH therein is low. Here, β-OH in the glass of the present embodiment is calculated according to the following formula, based on the transmittance measurement result using an infrared spectrophotometer.

$$\beta\text{-OH}=1/t\times\log_{10}(T_0/T)$$

(t means the thickness (mm) of the glass, $T_0$ means the transmittance at a wavelength of 3846 $cm^{-1}$ and T means the minimum transmittance at a wavelength of 3400 to 3700 $cm^{-1}$.)

Preferably, the glass of the present embodiment is such that the value of β-OH measured in the unpolished glass sheet is lower than the value of β-OH measured after polishing the surface layers of both the front and back surfaces of the glass sheet by 50 μm or more each. The difference between the value of β-OH measured in the unpolished glass sheet and the value of β-OH measured after polishing the surface layers of both the front and back surfaces of the glass sheet by 50 μm or more each is preferably 0.003 $mm^{-1}$ or more, more preferably 0.004 $mm^{-1}$ or more and even more preferably 0.006 $mm^{-1}$ or more, and is also preferably 0.03 $mm^{-1}$ or less, more preferably 0.02 $mm^{-1}$ or less and even more preferably 0.015 $mm^{-1}$ or less. When the difference value is 0.003 $mm^{-1}$ or more, the effect of increasing CS can be further enhanced. In turn, when 0.03 $mm^{-1}$ or less, glass heterogeneity owing to water content fluctuation would not occur and the stress distribution after chemical strengthening could be thereby stabilized.

The above-mentioned difference in β-OH indicates the water content in the surface layer part of the unpolished glass sheet, that is, the water content in the surface layer part that is removed by polishing, and seems to be a small value. However, in fact, it indicates a larger amount. The value of β-OH is obtained as a mean value in the sheet thickness direction. Consequently, the difference in β-OH before and after polishing corresponds to the value of the water content change in the surface layer part as averaged by the sheet thickness, and accordingly, the thinner the sheet thickness is, the smaller the difference value in β-OH before and after polishing is. Specifically, for example, in the case where a difference between β-OH of an unpolished glass sheet having a thickness of 1 mm and β-OH of a polished glass sheet prepared by polishing on both the front and back surfaces of a glass sheet having a thickness of 1 mm by 50 μm each, therefore having a thickness of 0 9 mm, is calculated, and if the value of β-OH of the only surface layer part of the glass sheet could be measured, this would indicate the value of about 10 times the difference in β-OH.

The glass of the present embodiment is generally tabular, but may be any of a planar sheet or a bent-processed glass sheet. The glass of the present embodiment is a glass sheet formed in a tabular form, for which the forming method is not specifically limited. From the viewpoint of CS increase, a float process or a fusion process where glass is formed while drawn is preferred since water can be evaporated away from the surface layer. In forming according to a roll-out process, water could hardly evaporate away.

The sheet thickness of the glass for chemical strengthening of the present embodiment is preferably 0.2 mm or more, more preferably 0.3 mm or more and even more preferably 0.4 mm or more. Also it is preferably 1 2 mm or less, more preferably 1.1 mm or less and even more preferably 0.9 mm or less. When the thickness of the glass sheet is 0.2 mm or more, the stress distribution after chemical strengthening can be stable. When the thickness of the glass sheet is 1.2 mm or less, the effect of increasing CS can be enhanced more.

The glass of the present embodiment is a glass when chemically strengthened without being polished, CS can be higher than that when chemically strengthened after polished. In particular, it is preferable that the glass sheet is, after formed according to a float process, chemically strengthened while the surface layers of both the front and back surfaces of the glass sheet are not as yet polished away, since CS can be high. CS of a conventional glass sheet could be increased by polishing, but on the contrary, the glass of the present embodiment is characterized in that its CS is lowered by polishing. Accordingly, it is preferable that the glass of the present embodiment is chemically strengthened without polishing. Even when polished, the polishing amount per each surface is preferably 10 μm or less, more preferably 5 μm or less and even more preferably 3 μm or less. The water content in the glass gradually changes from the surface thereof to a depth of about 50 μm, and accordingly, when the polishing amount per each surface is 10 μm or less, the effect of increasing CS by vaporization of water can be realized.

In a glass sheet produced according to a float process, Sn has invaded to a depth of about 10 μm from the bottom surface that was kept in contact with a molten tin, and in the bottom surface, in general, $SnO_2$ is detected in an amount of 3 to 10 μg/$cm^2$. When the glass is polished, the $SnO_2$ concentration thereof lowers in accordance with the polishing amount. The glass of the present invention is preferably unpolished, and even when polished, the polishing amount per each surface is preferably 10 μm or less. The presence or absence of polishing of a glass sheet produced according to a float process can be determined, for example, by measuring the tin amount in the bottom surface of the glass.

The $SnO_2$ amount in the bottom surface can be determined by measuring the Sn content per unit area. Concretely, for example, the bottom surface may be etched by 10 μm or more in a hydrofluoric acid solution, and the Sn concentration in the solution may be quantified through ICP emission spectrometry. The amount of $SnO_2$ could be an almost constant value when etched by 10 μm or more from the bottom surface. The $SnO_2$ invasion profile in the depth direction may be in a constant form, and therefore through fluorescent X-ray analysis of the bottom surface using a calibration curve, it can also be determined.

The glass for chemical strengthening of the present embodiment has a size that can be formed according to a float process, a fusion process or the like. Specifically, a continuous ribbon-shaped glass formed in a tabular form having a constant width can be obtained. The glass of the present embodiment is finally cut into a size suitable for the intended use.

Specifically, it may have a size of displays of such as tablet PCs, smartphones, etc., or a size of windowpanes of buildings or houses. For displays, the short side thereof has a size of 45 mm or more, and for windowpanes, the short side thereof has a size of 200 mm or more. For immersing in a chemical strengthening tank, the long side is preferably 2000 mm or less. The glass of the present embodiment is generally cut in a rectangular form, but may also be in any other form such as circular form or polygonal form with no problem, including a perforated glass.

For example, in the case of a glass sheet having a thickness of 0.7 mm or 1.1 mm and having been chemically strengthened so as to have DOL of 8 µm or more, which is a most preferred case in the present embodiment, the CS thereof is 700 MPa or more in one-time chemical strengthening using a potassium nitrate salt having a high purity of 99.8% or more, preferably 730 MPa and more preferably 760 MPa. As one concrete example, a molten salt of potassium nitrate having a purity of 99.8% is used, and the glass is subjected to chemical strengthening treatment at 420° C. for 150 minutes. In this case, DOL is 8 µm or more and preferably 8.5 µm or more. CS is 700 MPa or more, preferably 730 MPa or more and more preferably 760 MPa or more.

In chemical strengthening in a scale of mass production, for example, in chemical strengthening with a 98% potassium nitrate salt, CS is 500 MPa or more, preferably 530 MPa or more, more preferably 560 MPa or more, and even more preferably 600 MPa or more. When the glass after chemical strengthening treatment is cut, it is preferably 900 MPa or less and more preferably 850 MPa or less.

In the present invention, the nitrate salt to be used in confirming CS increase is preferably potassium nitrate having a high purity of 99.8% or more. In the case where a repeatedly used nitrate salt is used, there is a concern that not only the value of CS may lower but also the effect for increasing CS would be unclear by the effect of sodium and the like introduced thereinto.

In measuring CS, the measurement of CS would be inaccurate when DOL is shallow. In chemical strengthening for confirming CS increase, DOL is preferably 8 µm or more. In chemical strengthening treatment at a constant temperature, with increase in the strengthening time, DOL increases in proportion to the square root of the time and CS lowers. In chemical strengthening for confirming CS increase, DOL is preferably 20 µm or less.

For confirming CS increase in the surface layer, the glass surface layer is polished away, and the polished glass sheet and the unpolished glass sheet are simultaneously immersed in a molten salt and chemically strengthened therein. In the present embodiment, water may escape from the surface to a depth of about 50 µm, and therefore, for confirming the effect of the present invention, the removal amount of the glass surface layer is preferably 50 µm or more. The surface layer may be removed by HF etching or the like, but in immersion in an acid, the glass components may selectively dissolve out and the evaluation would be incorrect. In the case where the effect of CS increase in the surface layer is remarkably expressed, CS may increase by 20 MPa or more as compared with that after polishing.

The value of DOL of the chemically strengthened glass of the present embodiment is preferably 6 µm or more, more preferably 8 µm or more, and when influenced by scratches during handling of the glass, it is preferably 10 µm or more. In order for enabling cutting after the chemical strengthening treatment, it is preferably 30 µm or less, more preferably 25 µm or less and even more preferably 20 µm or less.

It is preferable that the glass of the present embodiment can be readily converted from ordinary soda lime glass from the viewpoint of both production characteristics and product characteristics. Regarding an ordinary soda lime glass, the temperature ($T_2$) for log $\eta=2$, which is a basis of high-temperature viscosity in glass melting, is generally 1445 to 1475° C.

When the high-temperature viscosity increase in melting is within a range of up to about +50° C., the glass of the present embodiment can be readily produced in the production furnace where an ordinary soda lime glass is melted. Regarding the high temperature viscosity in melting the glass of the present invention, the temperature for log $\eta=2$ is preferably 1520° C. or lower and more preferably 1500° C. or lower.

Regarding ordinary soda lime glass, the temperature ($T_4$) for log $\eta=4$, which is a basis of high-temperature viscosity in glass formation according to a float process, is generally 1020 to 1050° C. When the increase in the high-temperature viscosity at the temperature to give that viscosity is within a range of up to about +30° C., the glass of the present embodiment can be readily produced in the production furnace where an ordinary soda lime glass is formed. Regarding the, high temperature viscosity in forming the glass of the present invention, the temperature for log $\eta=4$ is preferably 1080° C. or lower and more preferably 1060° C. or lower.

In producing a glass according to a float process, the devitrification temperature ($T_L$) is compared with the above-mentioned temperature for log $\eta=4$ for making a judgment about a risk of devitrification. In general, when the devitrification temperature of a glass is a temperature not higher by 15° C. than the temperature for log $\eta=4$, it can be produced according to a float process without causing devitrification, and preferably, it is not higher than the temperature for log $\eta=4$. Specifically, $T_4$-$T_L$ is −15° C. or higher, preferably 0° C. or higher.

The specific gravity at room temperature of an ordinary soda lime glass is 2.490 to 2.505. In consideration of a case where the glass of the present embodiment and an ordinary soda lime glass are alternately produced in the same furnace, when the specific gravity fluctuation is 0.01 or less, the composition change is easy. The specific gravity of the glass of the present embodiment is preferably 2.480 or more and 2.515 or less.

Regarding the temperature for performing chemical strengthening treatment, an effective treatment temperature may be determined on the basis of the strain point of glass. In general, chemical strengthening treatment is carried out at a temperature lower than the strain point by 50 to 100° C. The strain point of an ordinary soda lime glass is 490 to 520° C.

For applying the same chemical strengthening treatment as a conventional one to the glass of the present embodiment, the strain point thereof is preferably 480 to 540° C. and more preferably 490 to 530° C. A highly skilled technique is necessary for strain point measurement, and therefore, the thermal expansion coefficient is measured to determine the glass transition temperature $T_g$, and this may be used as a substitute. In general, $T_g$ is higher temperature by about 40° C. than the strain point. $T_g$ of the glass of the present embodiment is preferably 520 to 580° C. and more preferably 530 to 570° C.

The thermal expansion coefficient of an ordinary soda lime glass is generally a value of $85\times10^{-7}$ to $94\times10^{-7\circ}$ C.$^{-1}$ in a temperature range of 50 to 350° C. Glass for displays can be a product for information instruments via various steps of film formation, lamination, etc. In the process, it is desired that the thermal expansion coefficient does not greatly vary from an ordinary value. The thermal expansion coefficient of the glass of the present embodiment is $83\times10^{-7}$ to $97\times10^{-7\circ}$ C.$^{-1}$ and preferably $85\times10^{-7}$ to $94\times10^{-7\circ}$ C.$^{-1}$.

For the glass of the present embodiment, a glass sheet formed according to a predetermined production method, for example, a glass sheet obtained by cutting a glass ribbon formed according to a float process is, without polishing the surfaces of the glass sheet, processed once for an ordinary chemical strengthening treatment that has heretofore been applied to an ordinary soda lime glass. Even when the surfaces of the glass sheet are polished, the polishing amount per one surface is preferably 10 μm or less, more preferably 5 μm or less and even more preferably 3 μm or less. The water content in glass gradually varies from the surface toward the depth thereof of about 50 μm, and therefore, when the polishing amount is 10 μm or less, the effect of CS increase owing to water vaporization could be realized. In the present embodiment, even an ordinary chemical strengthening treatment can provide a chemically strengthened glass having a higher strength. For example, by immersing in a molten salt of potassium nitrate at 410 to 470° C. for 1 to 24 hours, the chemical strengthening treatment can be carried out.

The glass of the present embodiment can be cut after chemical strengthening treatment. Regarding the cutting method, scribing and braking with an ordinary wheel chip cutter is applicable, and cutting with a laser is also applicable. For maintaining the glass strength, chamfering of the cut edges may be performed after the cutting. The chamfering may be a mechanical grinding process, or a method of processing with a chemical of hydrofluoric acid or the like may also be employed.

EXAMPLES

[Evaluation Methods]
(1) Surface compressive stress (CS) and depth of compressive stress layer (DOL)
 The surface compressive stress and the depth of the compressive stress layer were measured by using a surface stress meter FSM-6000, manufactured by Orihara Manufacturing Co., Ltd.
(2) Specific Gravity
 The specific gravity was measured according to an Archimedes' method.
(3) Thermal Expansion Coefficient
 The thermal expansion coefficient was determined as a mean linear thermal expansion coefficient at 50 to 350° C., by using TMA.
(4) Glass Transition Point ($T_g$)
 The glass transition point was measured with TMA.
(5) Strain Point
 This was measured according to a fiber elongation method.
(6) High-Temperature Viscosity
 The temperature ($T_2$) at which the viscosity is $10^2$ dPa·s and the temperature ($T_4$) at which the viscosity is $10^4$ dPa·s were measured by using a rotational viscometer.
(7) Devitrification Temperature ($T_L$)
 Regarding the devitrification temperature, the glass was ground into glass grains of about 2 mm in a mortar, and the glass grains were spread in a platinum boat, and heat-treated at intervals of 5° C. for 24 hours in a temperature gradient furnace. The maximum value of the temperature of the glass grains in which crystals are deposited is referred to as the devitrification temperature.
(8) $SnO_2$ Amount in Bottom Surface
 This was measured through fluorescent X-ray analysis.
(9) Photoelastic Coefficient
 This was measured according to a disc compression method ("Measurement of Photoelastic Constant of Glass for Chemically Strengthening with Method of Compression on Circular Plate", by Ryosuke Yokota, in the Journal of Ceramic Society of Japan, 87 [10], 1979, pp. 519-522).
(10) Refractive Index
 This was measured according to a minimum deviation method, by using a spectrometer.
(11) β-OH
 By using an infrared spectrophotometer, the transmittance at a wavelength of 2.5 to 4 μm was measured, and β-OH was calculated according to the following formula.

$$\beta\text{-OH}=1/t\times\log_{10}(T_0/T)$$

t means the thickness measured (mm) of the glass, $T_0$ means the transmittance at a wavelength of 3846 cm$^{-1}$ and T means the minimum transmittance at a wavelength of 3400 to 3700 cm$^{-1}$.
(12) Glass Composition
 This was analyzed through fluorescent X-ray analysis.
(13) Redox
 $Fe^{2+}$ was quantified through bipyridyl absorptiometry, and from the value of total $Fe_2O_3$ determined by the fluorescent X-ray analysis, $Fe^{2+}/(Fe^{2+}+Fe^{3+})$ was calculated.

A glass sheet whose composition, as expressed by mass percentage based on oxides, is shown in Table 1 was produced in a float furnace. Silica sand, soda ash, dolomite, feldspar and mirabilite were used as raw materials for glass, and melted by burning of natural gas, and formed into a glass ribbon of about 0.7 mm, 1.1 mm or 5 mm in a float bath thereby preparing glass sheets of samples 1-1, 1-2 and 1-3. In this process, the dew point in the float bath was controlled to be lower than usual to realize a condition where the water in the surface layers of the glass sheet could readily evaporate. The composition in the Table is the analytical value in fluorescent X-ray analysis to measure one surface of each glass sheet after the one surface was polished by 100 μm. Redox of the glass of the sample 1-1 was 28.7%. In changing the thickness of the glass of the sample 1-1, any intentional glass composition change was not carried out.

The glass sheet of the samples 1-1, 1-2 and 1-3 was cut into a piece of 50 mm square, and both the front and back surfaces of the glass sheet were almost uniformly polished to prepare a glass sheet having a thickness of about 0.55 mm. The thickness before and after polishing is shown in Table 1.

Figure 1:
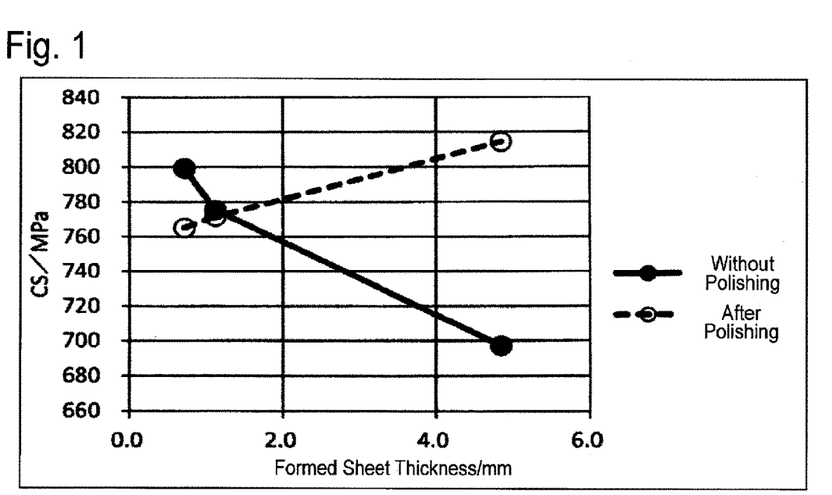
FIG. 1 shows results of measurement of CS of a glass after chemically strengthening an unpolished or polished glass.
Figure 2:
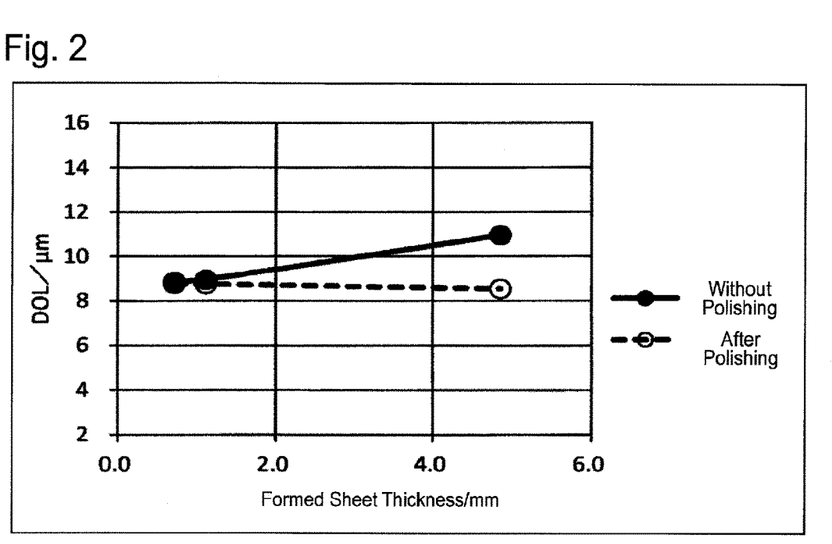
FIG. 2 shows results of measurement of DOL of a glass after chemically strengthening an unpolished or polished glass.

The unpolished samples of the three kinds of glass sheets that had been formed to have a different thickness, and the polished samples of the glass sheets having three kinds of thickness that had been polished to have a thickness of about 0.55 mm, totaling six kinds of glass samples were packed in a cassette for chemical strengthening, and chemically strengthened simultaneously. By using an experimental reagent, potassium nitrate salt, these were subjected to immersion treatment at a temperature of 420° C. for 150 minutes. After the treatment, the surface compressive stress of each glass was measured, and the results are shown in Table 1. The values of the photoelastic constant and the refractive index used in the stress measurement are shown in Table 2. The measured results of CS are shown in Table 1 and FIG. 1, and the measured results of DOL are shown in Table 1 and FIG. 2.

The polished samples mean those from which the influence of water vaporization, during production, from the surface layers of the glass sheet was removed. Regarding the measured results of the surface compressive stress of the polished samples, CS is higher with the increase in the thickness of the original glass sheet and DOL is an almost constant value. In glass sheets with large thickness, passing speed in the annealing furnace is slow and therefore they are more slowly annealed. As a result, the structural temperature of the glass lowers. When the surface layers of those glass sheets are polished away so that the sheets could be free from the influence of water vaporization therefrom and when the glass sheets under that condition are chemically strengthened, the structural temperature of the glass is lowered and therefore CS thereof could be high. Specifically, it may be said that, in the absence of the influence of water vaporization from the surface layers of glass sheets, CS could be more favorably increased in glass sheets with larger thickness in chemical strengthening.

However, when the unpolished samples are compared with the polished samples, CS is higher in the unpolished ones than in the polished ones in the case where the thickness is small (in the present Example, in the case where the thickness is 0.72 mm or 1.12 mm). DOL is constant. In the case where the thickness is large (in the present Example, in the case where the thickness is 4.85 mm), CS is lower in the unpolished ones than in the polished ones and DOL is larger in the former. As described above, it is considered that such a behavior would appear depending on the balance between the composition fluctuation in the surface layer and the water vaporization. The results of measurement of β-OH before and after polishing are shown in Table 1. As shown in Table 1, it is known that the water content in the surface layer is lowered. From the above, in the case where the thickness if small, which is disadvantageous in chemical strengthening treatment, especially in the case of 1.2 mm or less, CS can be increased in chemical strengthening treatment by employing a production method where water is evaporated away from the surface layer of a glass sheet.

Next, the case where the glass of the present Example and an ordinary soda lime glass are chemically strengthened under the same condition is described with reference to Table 2. The composition, the physical properties and the stress after chemical strengthening of the glasses evaluated here are shown in Table 2. The glass of Example 1 has the same composition as the glass shown in Table 1, from which glass sheets having a thickness of 0.7 mm and 5 mm were produced. The glass of Example 2 is an ordinary soda lime glass for comparison. From the ordinary soda lime glass, glass sheets having a thickness of 0.7 mm and 5 mm were produced. For composition analysis, the glass sheet of 5 mm thick was analyzed, and the value of the $SnO_2$ amount in the bottom surface is a result of analysis of the unpolished glass sheet of 0.7 mm thick through fluorescent X-ray analysis. For the physical properties, the glass sheet of 5 mm thick was analyzed, and the specific gravity, the thermal expansion coefficient, $T_g$, the strain point, the high-temperature viscosity, the devitrification temperature, the photoelastic constant, and the refractive index thereof are shown. The surface compressive stress and the depth of compressive stress after chemical strengthening treatment are the result of measuring the glass sheet of 0.7 mm thick. The condition for the chemical strengthening treatment is the same as that in Table 1.

TABLE 1

| Sample No. | | 1-1 | 1-2 | 1-3 |
|---|---|---|---|---|
| Thickness [mm] | unpolished | 0.72 | 1.12 | 4.85 |
| | polished | 0.53 | 0.55 | 0.57 |
| Components [wt %] | $SiO_2$ | 68.2 | 68.2 | 68.4 |
| | $Al_2O_3$ | 4.94 | 4.94 | 4.95 |
| | CaO | 7.22 | 7.23 | 7.25 |
| | MgO | 4.12 | 4.15 | 4.1 |
| | $Na_2O$ | 14.8 | 14.8 | 14.6 |
| | $K_2O$ | 0.19 | 0.19 | 0.2 |
| | $SO_3$ | 0.27 | 0.27 | 0.26 |
| | $Fe_2O_3$ | 0.115 | 0.115 | 0.116 |
| | $TiO_2$ | 0.13 | 0.13 | 0.13 |
| | Total | 100.0 | 100.0 | 100.0 |
| $(Na_2O + K_2O)/Al_2O_3$ | | 3.03 | 3.03 | 2.99 |
| β-OH [$mm^{-1}$] | unpolished | 0.215 | 0.214 | 0.220 |
| | polished | 0.221 | 0.222 | 0.225 |
| | difference | 0.006 | 0.008 | 0.005 |
| CS [MPa] | unpolished | 799 | 775 | 697 |
| | polished | 765 | 772 | 814 |
| DOL [μm] | unpolished | 8.9 | 8.9 | 11.0 |
| | polished | 8.8 | 8.7 | 8.5 |

TABLE 2

| | | Example 1 | Example 2 |
|---|---|---|---|
| (mass %) | $SiO_2$ | 68.40 | 72.00 |
| | $Al_2O_3$ | 4.95 | 1.86 |
| | CaO | 7.25 | 7.82 |
| | MgO | 4.10 | 4.69 |
| | $Na_2O$ | 14.6 | 13.0 |
| | $K_2O$ | 0.20 | 0.31 |
| | $TiO_2$ | 0.13 | 0.07 |
| | $Fe_2O_3$ | 0.116 | 0.104 |
| | $SO_3$ | 0.26 | 0.19 |
| | Total | 100.0 | 100.0 |
| $(Na_2O + K_2O)/Al_2O_3$ | | 2.99 | 7.16 |
| $SnO_2$ amount in bottom surface, 0.7 mm | (μg/$cm^2$) | 4.6 | 6.4 |
| Specific Gravity | | 2.5019 | 2.4945 |
| Thermal Expansion Coefficient | ($10^{-7}$° $C.^{-1}$) | 91 | 88 |
| Glass Transition Point | (° C.) | 552 | 553 |
| Strain Point | (° C.) | 512 | 511 |
| $T_2$ | (° C.) | 1473 | 1471 |
| $T_4$ | (° C.) | 1042 | 1039 |
| $T_L$ | (° C.) | 1025 | 1020 |
| $T_4 - T_L$ | (° C.) | 17 | 19 |
| Photoelastic Constant | (nmcm/MPa) | 27.1 | 27.1 |
| Refractive Index | | 1.518 | 1.518 |
| CS | (MPa) | 799 | 698 |
| DOL | (μm) | 8.9 | 7.4 |

As shown in Table 2, the glass of Example 1 has almost the same physical properties as those of the ordinary soda lime glass of Example 2, and the $SnO_2$ amount in the bottom surface is smaller in the glass of Example 1, from which it is known that in production according to a float process, there is an effect of preventing the invasion of tin. Further, it is known that in the chemically strengthened glass of Example 1, CS is increased by about 100 MPa than in the chemically strengthened glass obtained by performing the same chemical strengthening treatment to the ordinary soda lime glass of Example 2.

While the present invention has been described in detail and with reference to specific embodiments thereof, it will be apparent to one skilled in the art that various changes and modifications can be made therein without departing from the spirit and scope of the present invention.

The present application is based on Japanese Patent Application (Application No. 2013-258464) filed on Dec. 13, 2013 and Japanese Patent Application (Application No. 2014-022724) filed on Feb. 7, 2014, and the entire thereof is incorporated herein by reference.

INDUSTRIAL APPLICABILITY

The chemically strengthened glass of the present invention to be obtained by chemically strengthening the glass for chemical strengthening of the present invention can be utilized for cover glasses in display devices, especially in touch panel displays. In addition, it can also be utilized in multilayer glasses for buildings and houses and for solar cell substrates, etc.

The invention claimed is:

1. A glass sheet comprising, as expressed by mass percentage based on oxides:
60 to 75% of $SiO_2$,
3.6 to 9% of $Al_2O_3$,
2 to 10% of MgO,
0 to 10% of CaO,
0 to 3% of SrO,
0 to 3% of BaO,
10 to 18% of $Na_2O$,
0 to 8% of $K_2O$,
0 to 3% of $ZrO_2$,
0 to 0.3% of $TiO_2$,
0.005 to 0.2% of $Fe_2O_3$, and
0.02 to 0.4% of $SO_3$,
wherein:
the glass sheet has a thickness of 0.2 mm or more and 1.2 mm or less,
a temperature for $\log\eta=2$ of the glass sheet is 1520° C. or lower,
a temperature for $\log\eta=4$ of the glass sheet is 1080° C. or lower, and
when the glass sheet is subjected to polishing so that surface layers of each of a front surface and a back surface of the glass sheet are polished by 50 μm or more, a value of β-OH measured before polishing is lower than a value of β-OH measured after, and a difference between the value of β-OH measured before polishing and the value of β-OH measured after polishing is 0.003 $mm^{-1}$ or more.

2. The glass sheet according to claim 1, wherein the glass sheet is formed by a float process.

3. The glass sheet according to claim 2, wherein the surface layers of the front and back surfaces of the glass sheet are not polished away after the glass sheet is formed by the float process.

4. A chemically strengthened glass sheet obtained by chemically strengthening the glass sheet according to claim 1.

5. The chemically strengthened glass sheet according to claim 4, having a surface compressive stress of 600 MPa or more and a depth of compressive stress of 6 μm or more and 30 μm or less.

6. The chemically strengthened glass sheet according to claim 4, having a surface compressive stress of 700 MPa or more and a depth of compressive stress of 8 μm or more and 20 μm or less.

7. A method for producing a chemically strengthened glass, comprising subjecting the glass sheet according to claim 1 to an ion-exchange treatment.

8. The glass sheet according to claim 1, wherein a ratio of amounts of $Na_2O$, $K_2O$, $Al_2O_3$, as expressed by mass percentages based on oxides, $(Na_2O + K_2O)/Al_2O_3$, is 2.2 or more and 4 or less.

* * * * *